UNITED STATES PATENT OFFICE.

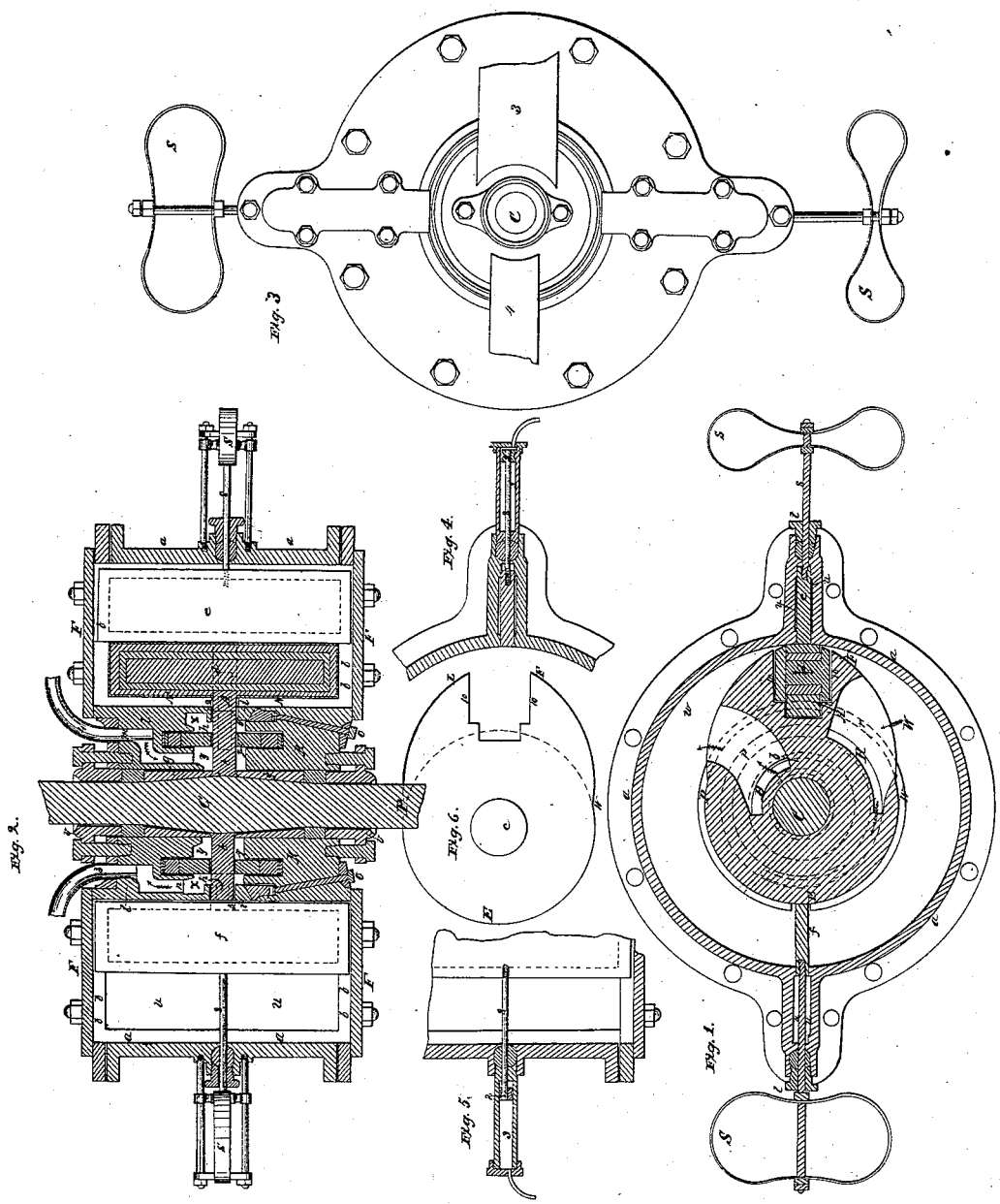

A. K. RIDER AND W. S. RIDER, OF NEW YORK, N. Y., ASSIGNORS IN PART TO JOHN ANDERSON.

ROTARY STEAM-ENGINE.

Specification of Letters Patent No. 3,039, dated April 10, 1843.

*To all whom it may concern:*

Be it known that we, ALEXANDER KIRK RIDER and WILLIAM SYKEX RIDER, of the city of New York and State of New York, have invented a new and Improved Arrangement of Rotary Steam or Air Engines, as by reference to the accompanying diagram, and which is to be taken as a part of this specification, will more fully appear.

Figure 1 represents a transverse section. Fig. 2 represents a longitudinal section. Fig. 3 represents an elevation. Figs. 4 and 5 represent sections of the valves and valve rods separately. Fig. 6 represents an outline of the center piece.

a, a, a, on Figs. 1 and 2 represents the cylinder. It is bored out and has two recesses opposite each other, represented by u, u, u, u, of sufficient size to admit the valves e and f their entire breadth.

b, b, represents the center piece or piston plate. It is of eccentric form, as seen at Fig. 6, which shows the outline of the center piece. From W, by E, to P, is a part of a circle described from the center of the shaft c; and from P, by L F to W, is a curved line, going off gradually from the circle so as to meet the outer edge of the piston d at L on Fig. 1 and from F (on Fig. 6) gradually descending toward the circle with which it joins at W. In the center piece between L, and F, there is a space or slat, of sufficient size to admit the piston d, (on Fig. 1) which is fitted into this slat, in such manner that the inner edge of the piston shall touch the cylinder covers at N, N, (on Fig. 2) the outer edge of the piston touching the cylinder and forming a part of the curve P L F W on Fig. 1. The center piece is of this form for the purpose of working the valves, as explained in the operation of the same. In the center piece there are also two openings for the purpose of admitting and letting off the steam. The openings for the admission of the steam enters the center piece between the ring or bearing g, Fig. 2, and the ring h, h, and passing toward the circumference, comes into the steam space w, w, w, behind the piston as seen at p on Fig. 1. The escape opening enters the circumference of the center piece from the steam space a little before the piston and passing toward the shaft, as seen at r on Fig. 1, comes into the space x upon Fig. 2 between a part of the cylinder cover l, l, and the ring h, h. This ring is similar to the ring z, z, on the other side of the center piece. The use of these rings is to keep the steam in the space y, from escaping into the space x. They are packed behind and kept out by screws or springs; c, the shaft, is secured in the center piece and is somewhat thicker in the middle where the two rings or bearings g, g, are fitted on. These rings are bored out tapering to fit the shaft and form the main or center bearing. The object of their being so bored out is to keep the main center from becoming loose. The rings tighten on the shaft (which forms the main center) as the stuffing boxes v, v, are screwed up.

l, l, and R, R, are cylinder covers. The cover l, l, on Fig. 2 is fitted to the cylinder so as to form part of the steam space w, w, w, w, and touching the center piece at 2, 2, prevents the escape of steam at that place. It also forms the space x and y, by not coming close to the center piece at that place and it has also a groove or recess for the ring h, h. In this cover the steam and escape openings m, and n, on Figs. 1 and 2 are formed and come into their respective spaces y and x. Their respective pipes are fixed in this cover at 4, and 3. The other cover R, R, is similar but is fitted with the large ring i, i, which is capable of motion endwise by the screws o, o, or by springs for the purpose of keeping the center piece steam tight at 5, 5. This ring must also be packed as represented in the dotted space in the diagram. In these covers there are also grooves cut 6, 6, 6, 6, corresponding with the recess in the cylinder in such manner that when the valves e and f are in the steam space w, w, w, they shall be supported on all sides by the grooves and the recesses w, w, as seen by the valve f. These covers are bored out in the center to admit the center bearings or rings g g and the stuffing boxes v, v. The sliding valves e, and f, are capable of motion from the steam space w, w, w, to the bottom of the recess u, u, u, u. The valve f, is shown as being in its position in the steam space. The valve e is in the recess to allow the piston d, to pass freely. The springs s, s, are attached to the valves by means of the valve rod 8, 8, through the stuffing boxes t, t. These springs are made of various forms and sometimes may be put inside the recess u, u, immediately behind the valves. The valves are also sometimes returned into the steam space by having a small piston 2d Figs. 4, and 5, attached to each of the valve rods 8, 8, acting inside of a small cylinder 3 by the pressure of steam or air on the small piston acting as a spring. F, F, F, F, are four caps or covers for the greater convenience of fitting in the grooves and taking out the valves. The piston $d$ is fitted into the center piece at 10, 10 Fig. 1 and is furnished with metallic packing which is kept out by hemp or springs and has a small projection fitting into the center piece at A, Figs. 1 and 2, for the purpose of making the packing steam tight at that place.

The operation is as follows. The steam enters through the pipe 4 on Figs. 2 and 3 and passes into the opening $m$ (Figs. 1 and 2,) in the direction as pointed by the arrow. It finds the space $y$, thence passing it comes into the opening B, (Fig. 1) and entering it passes in the direction pointed by the arrow and enters the steam space $w, w, w$, where its course is arrested by the valve $f$ and the piston $d$. It exerts a pressure against the valve and piston until the piston gives way and moves in the direction also pointed by the arrow. The valve $e$ then begins to move into the steam space by the spring S pressing on the valve rod 8, the elliptical part of the center piece moving away. The valve $e$ gradually finds its place in the steam space. As the piston moves on, the valve $f$ is gradually pressed into its recess by the elliptical part of the center piece moving it so that the piston may freely pass. The pressure now coming upon the valve $e$ and the steam being liberated by the valve $f$ moving escapes in the direction marked by the opening R, into the space $x$ through the passage $u$ and being let off by the pipe 3 entirely escapes. Thus a continuous pressure is kept up behind the piston, while the valves are alternately pressed into their respective recesses by the elliptical part of the center piece and resume their places in the steam space by the action of the spring and also remain at rest half the circle; one half of the center piece being semi-circular to admit one valve to be in the steam space and ready to intercept the steam before the other valve lets the steam behind it off.

The petitioners claim as their invention and desire to secure by Letters Patent—

The foregoing improved combination, which consists in the method of working the slide valves $e$ and $f$ by the center piece or piston plate $b, b$, coming into immediate contact with the inner edges of the same, in the steam space $w, w, w$, and by its eccentric form throwing the slide valves out of the steam space at each revolution into which they are returned by the springs $s, s$, or by the pressure of air or steam acting on a small piston attached to each of the valve rods 8, 8; with the method in which the steam is admitted and let out by entering the center piece at an opening corresponding with one of the annular spaces formed by the insertion of the ring $h, h$, between the shaft and the projecting part of the cylinder cover and passing out by another opening in the center piece corresponding with the other annular space for the purpose and in the manner described.

Dated February 27th 1843.

ALEXANDER KIRK RIDER.
WILLIAM SYKEX RIDER.

Witnesses as to A. K. Rider:
C. P. BASSETT,
J. N. CUSHMAN.

Witnesses as to W. S. Rider:
SAMUEL B. STEVENS,
SANFORD ADAMS.